US009925926B2

(12) United States Patent
Flothmann et al.

(10) Patent No.: US 9,925,926 B2
(45) Date of Patent: Mar. 27, 2018

(54) BLIND ESPECIALLY FOR A STORAGE COMPARTMENT IN A MOTOR VEHICLE

(71) Applicant: fischer automotive systems GmbH & Co. KG, Horb a.N. (DE)

(72) Inventors: Jorg Flothmann, Bondorf (DE); Gunter Leopold, Baiersbronn (DE)

(73) Assignee: fischer automotive systems GmbH & Co. KG, Horb a.N. (DE)

( * ) Notice: Subject to any disclaimer, the term of this patent is extended or adjusted under 35 U.S.C. 154(b) by 160 days.

(21) Appl. No.: 15/061,099

(22) Filed: Mar. 4, 2016

(65) Prior Publication Data

US 2016/0257256 A1  Sep. 8, 2016

(30) Foreign Application Priority Data

Mar. 5, 2015   (DE) .......................... 10 2015 002 758

(51) Int. Cl.
*B60R 7/04* (2006.01)

(52) U.S. Cl.
CPC ..................................... *B60R 7/04* (2013.01)

(58) Field of Classification Search
CPC ....................................................... B60R 7/04
USPC ........................... 296/37.8, 24.34; 160/231.2
See application file for complete search history.

(56) References Cited

U.S. PATENT DOCUMENTS

| 4,379,585 A * | 4/1983 | Strick ....................... B60J 5/125 160/195 |
| 5,330,246 A * | 7/1994 | Bernardo .................. B60J 7/068 160/130 |
| 6,024,402 A * | 2/2000 | Wheatley ................. B60J 7/102 224/403 |
| 2006/0037713 A1* | 2/2006 | Ichimaru ................... B60R 7/04 160/37 |

FOREIGN PATENT DOCUMENTS

| DE | 196 46 809 A1 | 5/1998 |
| DE | 102 58 468 B3 | 8/2004 |
| DE | 20 2011 000 802 U1 | 6/2011 |
| EP | 0 569 389 A1 | 11/1993 |
| EP | 0 596 389 A1 | 5/1994 |
| WO | WO 92/12793 A1 | 8/1992 |

OTHER PUBLICATIONS

German Search Report dated Oct. 22, 2015 for German Application No. 10 2015 002 849.9.

* cited by examiner

*Primary Examiner* — Joseph D. Pape
(74) *Attorney, Agent, or Firm* — Renner Otto Boisselle & Sklar, LLP

(57) ABSTRACT

A blind for closing a storage compartment in a central console of a motor vehicle is provided. The blind has rod-shaped guide elements which are slidably guided in lateral grooves. Slats are clipped onto the guide elements, which slats project laterally and become wider in a longitudinal direction of the blind, so that in a closed position of the blind they completely cover an intermediate space between two obliquely diverging side walls of the central console.

11 Claims, 1 Drawing Sheet

BLIND ESPECIALLY FOR A STORAGE COMPARTMENT IN A MOTOR VEHICLE

CROSS-REFERENCE TO RELATED APPLICATION

The present application claims priority under 35 USC § 119 to German Patent Application No. 10 2015 002 758.1, filed on Mar. 5, 2015, the entire disclosure of which are incorporated herein by reference.

TECHNICAL FIELD OF THE INVENTION

The invention relates to a blind. It can be used for closing any desired openings per se, but the blind according to the invention is intended especially for closing a storage compartment in a motor vehicle.

DESCRIPTION OF THE RELATED ART

Such a blind is known from Utility Model DE 20 2011 000 802 U1. The known blind has slats which are mounted on rod-shaped guide elements; both the slats and the guide elements parallel to the slats extend transversely with respect to a sliding direction of the blind. The guide elements project laterally and are installed in lateral guide grooves which are arranged spaced apart from one another and parallel to one another. "Parallel" means that the guide grooves are arranged in notional, mutually parallel planes that are spaced apart from one another and are congruent seen from one side. The two guide grooves extend laterally along the opening to be closed and at one end run in a curve downwards and then, for example, under the storage compartment. The spatial directions refer to a storage compartment that is open at the top. For closing the storage compartment or an opening generally, the blind is located in or on the opening. For opening, the blind is able to slide in the lateral guide grooves, so that at one end it moves around, for example, the storage compartment on the underside thereof.

SUMMARY OF THE INVENTION

The problem of the invention is to propose a blind which in the closed position covers its lateral guide means.

That problem is solved by the invention as described herein. For example, a blind has slats and guideways which effect slidable guidance of the slats. The guideways are, for example, guide grooves in which guide elements engage so that they are slidably guided in the longitudinal direction of the guideways. The slats are arranged on the guide elements. By means of the guide elements the slats are slidably guided in the longitudinal direction of the guideways. The guideways run in notional, mutually parallel planes. Seen from one side, that is to say perpendicular to the notional, parallel planes in which the guideways are located, the guideways are congruent. The guideways can be straight and/or curved with varying radii of curvature. The slats are spaced apart from the guideways; they are located outside a notional surface defined by the guideways. This makes it possible for the slats to be wider than the spacing of the guideways from one another, so that the slats cover the guideways. "Cover" here means especially with respect to a viewing direction perpendicular to the notional surface defined by the guideways. This has the advantage that, when the blind is closed, the guideways at the sides of the opening that is closable by the blind are covered by the slats and are not visible and are also protected from soiling. "Width" means a dimension of the slats transverse with respect to a sliding direction. Typical strip-shaped slats are multiple times wider transversely with respect to their sliding direction than they are long in the sliding direction. The spacing of the slats from the guideways relates to the slat itself and here especially to a visible surface of the slat, but not to any connecting elements integral with the slat and used for connection to guide elements.

In a development of the invention, the slats are of different widths. In particular, the width of the slats varies in a longitudinal direction of the blind, that is to say the slats become increasingly wider in that longitudinal direction and project laterally increasingly further over the guideways from slat to slat. In that case, lateral ends of the slats preferably run obliquely, so that the sides of the blind run obliquely or even in a curve, without a step, from slat to slat. "Width" means, as stated, a dimension of the slats transverse with respect to the sliding direction and parallel to the notional surface defined by the guideways.

One arrangement of the invention provides an articulated or flexible connection of guide elements which are slidably guided with the guideways and on which the slats, especially in the form of separate components, are arranged. As a result, the slats are able to slide through curved sections of the guideways curved sections of the guideways can pivot relative to one another. The slats are connected to one another by way of the guide elements.

The guide elements can extend continuously between the two guideways. It is also possible for guide elements on the two guideways to be connected by the slats.

In one arrangement of the invention, the guideways have guide grooves and in the guide grooves the guide elements have an elasticity perpendicular to a surface, especially a visible surface, of the blind. The elasticity prevents rattling noises as a result its resting resiliently under a (slight) bias and therefore without play against one or both groove walls or by virtue of its resilience. To implement the elasticity, resilient rings or (short) pieces of tubing can be mounted on the guide elements, or resilient elements can be inserted in grooves or the like of the guide elements. Another possibility is for a resilient plastics material to be injection-moulded onto or around the guide elements, at least in a region that is located in the guide grooves.

For a flexible connection of the guide elements, one arrangement of the invention provides flexible tongues which connect the guide elements to one another. The flexible tongues can be integral with the resilient elements of the guide elements.

An arrangement of the invention provides a tension means, such as, for example, a cord, in addition to any flexible tongues, which tension means connects the guide elements to one another so as to be resistant to tension. The tension means relieves the flexible tongues of load and protects them from tearing.

BRIEF DESCRIPTION OF THE DRAWING

The invention is described in greater detail below with reference to an exemplary embodiment shown in the drawing. In the drawing.

DETAILED DESCRIPTION OF THE INVENTION

Figure 1:
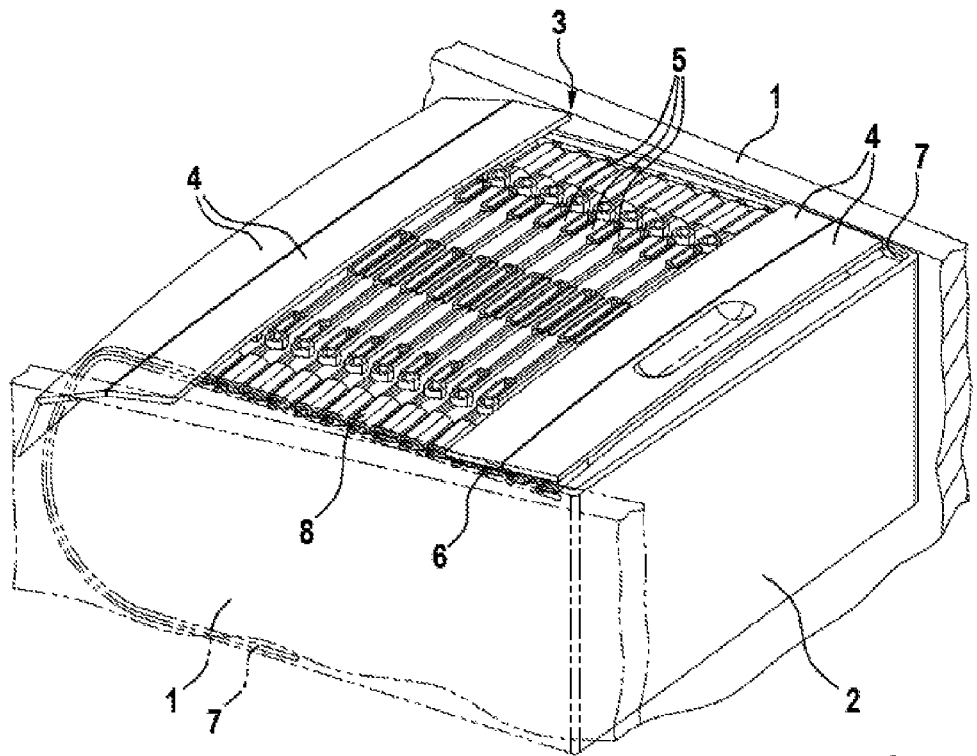
FIG. 1 shows a storage compartment in a central console of a motor vehicle having a blind according to the invention.
Figure 2:
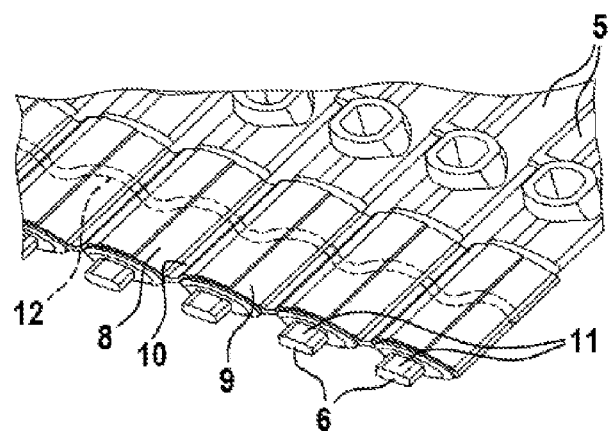
FIG. 2 shows an enlarged view of a detail.

FIG. 1 shows, in a broken-away view, side walls 1 of a central console which is arranged on a transmission tunnel of a motor vehicle. The side walls 1 of the central console do not run parallel but are spaced increasingly further apart from one another in one direction, to the left in FIG. 1. Between the side walls 1 there is arranged a box-shaped storage compartment 2, which is open at the top and has mutually parallel side walls. The storage compartment 2 is arranged to be closed with a blind 3 according to the invention, which blind has slats 4 that adjoin one another and extend transversely with respect to the storage compartment 2 and to a sliding direction of the blind 3. The slats 4 have a visible surface opposite an opening in the central console, that is to say at the top in FIG. 1. The slats 4 are clipped onto rod-shaped guide elements 5 which likewise extend transversely with respect to the sliding direction of the blind 3 and to the storage compartment 2. For that purpose, connecting elements (not shown) are arranged integrally on the slats 4. In order that the guide elements 5 can be seen in the Figure, the blind 3 is shown without slats 4 in a central region. The guide elements 5 extend from one side wall to an opposite side wall of the storage compartment 2 and have guide pins 6 at their ends, which can be clearly seen in the enlarged view in FIG. 2. The guide pins 6 engage in guideways 7 which are in the form of grooves in inner sides of the mutually parallel side walls of the storage compartment 2. The guideways 7 are therefore located in two mutually parallel planes. The guideways 7 define between them a notional surface, in this case a curved surface. The rod-shaped guide elements 5 are slidably guided in the guideways 7 by means of their guide pins 6, with which the blind 3 as a whole is also slidably guided on the guideways 7 in the form of grooves. The slats 4 of the blind 3 are slidably guided by way of the guide elements 5 onto which they are clipped. The guideways 7 run along upper edges in the side walls of the storage compartment 2, which is open at the top, that is to say the guideways 7 run laterally along an opening of the storage compartment 2. At one end the guideways 7 come to an end and at the other end they run in a curve downwards as far as to below the storage compartment 2, so that the blind 3 is able to slide between a closed position, in which it covers the storage compartment 2, which is open at the top, and an open position in which the blind 3 runs in a curve around one end of the storage compartment 2 and as far as to below the underside thereof, and vice versa. The drawing shows the blind 3 in a slightly open position.

The slats 4 clipped onto the guide elements 5 are spaced apart vertically from the guide elements 5 and the guideways 7 and in the closed position are located above the side walls of the storage compartment 2. The slats 4 project laterally beyond the storage compartment 2, so that in the closed position of the blind 3 they extend as far as inner sides of the side walls 1 of the central console and cover the guideways 7. As the spacing between the side walls 1 of the central console increases in one direction, so the slats 4 of the blind 3 become wider in that direction and their lateral ends run obliquely to correspond to an angle at which the side walls 1 of the central console run relative to one another. In the closed position of the blind 3, the slats 4 extend from one side wall 1 of the central console to the other and completely cover the storage compartment 2. In the lower region of the storage compartment 2, the side walls 1 of the central console have recesses (not shown) for the slats 4 because, when the blind 3 is opened, the widest slat 4 below the storage compartment 2 moves in the direction in which a spacing between the side walls 1 of the central console becomes smaller.

At their ends the rod-shaped guide elements 5 are resiliently connected to one another by resilient bands 8 which have tubular portions in which the rod-shaped guide elements 5 are located and which are integrally connected to one another by tongue-like portions 10. The bands 8 are produced by overmoulding the ends of the rod-shaped guide elements 5 with a resilient plastics material. As stated, the resilient bands 8 connect the rod-shaped guide elements 5 of the blind 3 to one another, so that the guide elements 5 are able to slide along the guideways 7 together, including through the curved sections of the guideways 7. The guide pins 6 have grooves on their upper sides that face the slats 4, in which grooves the resilient plastics material of the bands 8 forms resilient elements 11. Those resilient elements 11, which are located in the grooves forming the guideways 7, prevent rattling noises.

The slats 4 are not directly connected to one another but are connected by way of the rod-shaped guide elements 5, to which they are clipped, and the resilient bands 8, which connect the guide elements 5.

In addition to the resilient bands 8, the rod-shaped guide elements 5 are connected to one another by cords 12. The cords 12 are located in the tubular portions 9 and the tongues 10 of the resilient bands 8; they are overmoulded with the resilient plastics material of the bands 8. The cords 12 are guided in a semicircle around the rod-shaped guide elements 5; as a result, the cords 12 need to be neither threaded through holes in the guide elements 5 nor inserted in grooves in the guide elements 5, with the result that cross-sectional weakening of the guide elements 5 is avoided.

LIST OF REFERENCE NUMERALS

Blind Especially for a Storage Compartment in a Motor Vehicle

1 side wall
2 storage compartment
3 blind
4 slat
5 guide element
6 guide pin
7 guideway
8 band
9 tubular portion
10 tongue
11 resilient element
12 cord

The invention claimed is:

1. A blind for closing an opening, the blind comprising:
   slats; and
   guideways which are arranged in notional, mutually parallel planes and effect slidable guidance of the slats, the slats being spaced apart from the guideways, wherein the slats cover the guideways,
   wherein the slats are of different widths.

2. The blind according to claim 1, wherein the slats become wider in a longitudinal direction of the blind.

3. The blind according to claim 1, wherein the blind has guide elements which are slidably guided with the guideways and are articulatedly or flexibly connected to one another and on which the slats are arranged.

4. The blind according to claim 2, wherein the guideways have grooves, and in the grooves the guide elements have a resilient element perpendicular to a sliding direction of the blind.

5. The blind according to claim 3, wherein the guide elements are connected to one another by flexible tongues.

6. The blind according to claim 3, wherein the guide elements are connected to one another by tension means.

7. The blind according to claim 5, wherein the guide elements are connected to one another by tension means.

8. A blind for closing an opening, the blind comprising:
slats; and
guideways which are arranged in notional, mutually parallel planes and effect slidable guidance of the slats, the slats being spaced apart from the guideways, wherein the slats cover the guideways,
wherein the slats become wider in a longitudinal direction of the blind.

9. The blind according to claim 8, wherein the blind has guide elements which are slidably guided with the guideways and are articulatedly or flexibly connected to one another and on which the slats are arranged.

10. The blind according to claim 8, wherein the guideways have grooves, and in the grooves the guide elements have a resilient element perpendicular to a sliding direction of the blind.

11. A blind for closing an opening, the blind comprising:
slats; and
guideways which are arranged in notional, mutually parallel planes and effect slidable guidance of the slats, the slats being spaced apart from the guideways, wherein the slats cover the guideways,
wherein the blind has guide elements which are slidably guided with the guideways and are articulatedly or flexibly connected to one another and on which the slats are arranged,
wherein the guide elements are connected to one another by flexible tongues and tension means.

\* \* \* \* \*